United States Patent
Godaliyadda et al.

(10) Patent No.: US 11,994,582 B2
(45) Date of Patent: May 28, 2024

(54) INVERSE RADAR SENSOR MODEL AND EVIDENTIAL GRID MAPPING PROCESSORS

(71) Applicant: Texas Instruments Incorporated, Dallas, TX (US)

(72) Inventors: Gunawath Dilshan Godaliyadda, Allen, TX (US); June Chul Roh, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 437 days.

(21) Appl. No.: 17/472,809

(22) Filed: Sep. 13, 2021

(65) Prior Publication Data

US 2023/0089552 A1   Mar. 23, 2023

(51) Int. Cl.
*G01S 13/931* (2020.01)
*G01S 13/72* (2006.01)
*G01S 13/00* (2006.01)

(52) U.S. Cl.
CPC .......... *G01S 13/931* (2013.01); *G01S 13/726* (2013.01); *G01S 2013/93274* (2020.01)

(58) Field of Classification Search
None
See application file for complete search history.

(56) References Cited

U.S. PATENT DOCUMENTS 5,123,057 A * 6/1992 Verly .................. G06V 10/255
706/900

6,125,339 A * 9/2000 Reiser ..................... G06F 18/25
702/123

(Continued)

FOREIGN PATENT DOCUMENTS

| DE | 102018100907 A1 * | 7/2019 | ............. G01S 13/89 |
| DE | 102019109332 A1 * | 10/2020 | ........... G01S 13/867 |
| WO | WO2020/094170 A1 * | 5/2020 | ........... G01S 13/867 |

OTHER PUBLICATIONS

C. Seeger et al., "Locally Adaptive Discounting in Multi Sensor Occupancy Grid Fusion"; Proceedings of the 2016 IEEE Intelligent Vehicle Symposium (IV); Gothenburg. SWEEDEN; Jun. 19-22, 2016. (Year: 2016).*

(Continued)

*Primary Examiner* — Bernarr E Gregory
(74) *Attorney, Agent, or Firm* — Michael T. Gabrik; Frank D. Cimino

(57) ABSTRACT

An apparatus includes an inverse radar sensor model processor and a grid mapping processor. The inverse radar sensor model processor receives radar sensor data for a time k from a radar sensor, generates object data based on the radar sensor data, and calculates instantaneous masses at the time k for each cell in a field of view (FOV) of the radar sensor based on the object data and a sensor characteristic. The inverse radar sensor model processor outputs the calculated instantaneous masses to the grid mapping processor, which also receives accumulated masses for each cell in the FOV for a time period 0:k−1. An accumulated mass represents a combination of instantaneous masses for the cell at each time increment in the time period 0:k−1. The grid mapping processor generates updated accumulated masses for a time period 0:k.

25 Claims, 5 Drawing Sheets

(56) References Cited

U.S. PATENT DOCUMENTS

| | | | | |
|---|---|---|---|---|
| 7,421,419 B2* | 9/2008 | Maren | ............... | G06F 18/254 |
| | | | | 706/52 |
| 10,657,393 B2* | 5/2020 | Foroughi | ............ | G01S 13/931 |
| 2002/0019697 A1* | 2/2002 | Cong | ................ | G01S 13/723 |
| | | | | 701/300 |
| 2003/0191610 A1* | 10/2003 | Chen | ................... | G06F 18/25 |
| | | | | 702/191 |
| 2021/0131823 A1* | 5/2021 | Giorgio | ............. | G01S 17/931 |

OTHER PUBLICATIONS

Godaliyadda, G. et al., "Multi-Sensor Fusion in Dynamic Environment Using Evidential Grid Mapping." Electronic Imaging, Jan. 2020, 6 pages.

* cited by examiner

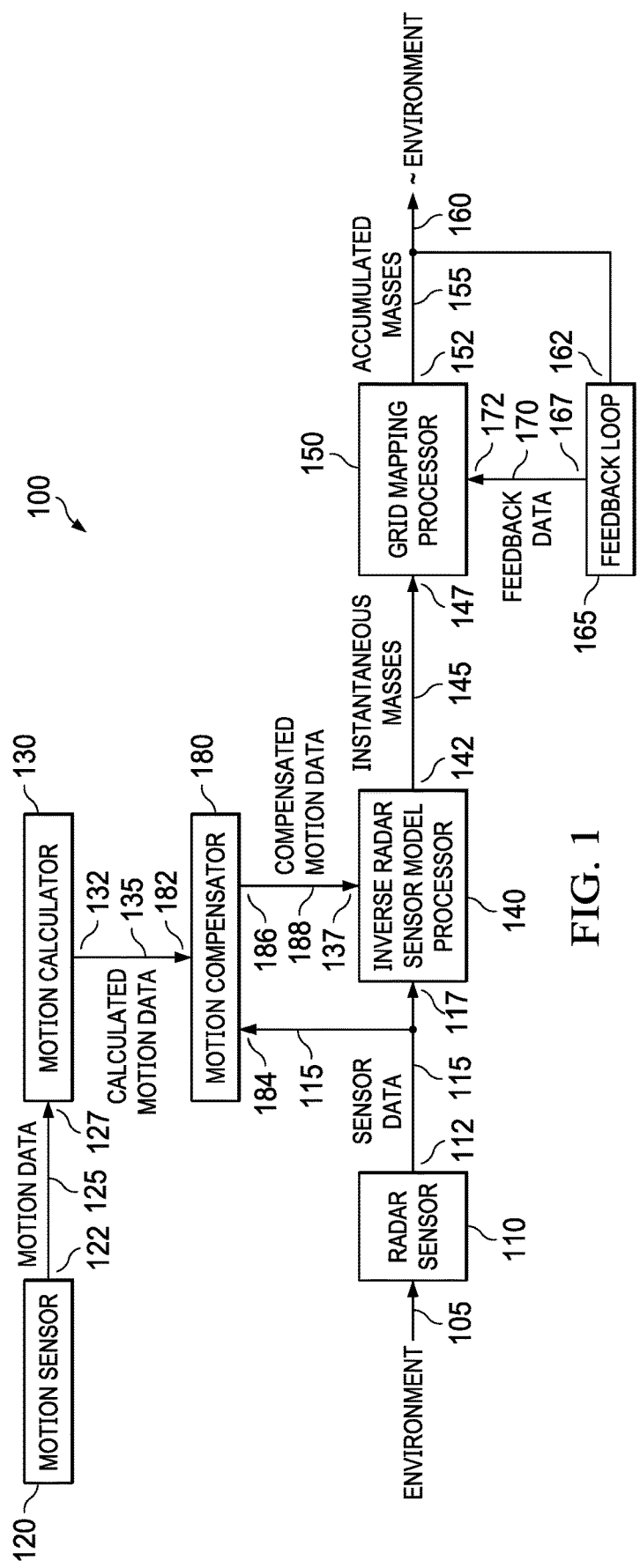
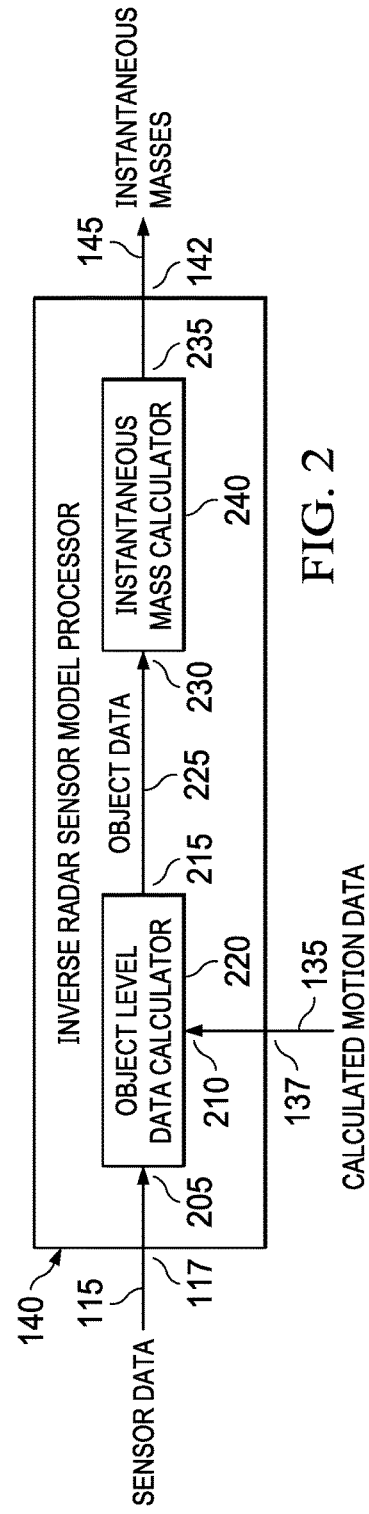
FIG. 1
FIG. 2

INVERSE RADAR SENSOR MODEL AND EVIDENTIAL GRID MAPPING PROCESSORS

BACKGROUND

Some radar sensor systems use evidential grid mapping algorithms to process the radar sensor data in the context of environmental understanding, where a grid map is used as a representation or approximation of the real environment. Each cell in a grid map represents a location in the environment, typically using a fixed frame, and is assigned a state, such as an "occupied" state that indicates a probability that an object is present at that location or a "free" state that indicates a probability that the location is unoccupied. The occupied state can be further refined to a "dynamic" state that indicates the probability that the object at the location is moving (that is, "dynamic") and a "static-dynamic" state used to represent an uncertainty whether the object at the location is stationary, that is, "static," or dynamic. When a radar sensor is mounted on a moving platform, it can be difficult to determine whether a measurement is indicative of a static object or a dynamic object. The static-dynamic state is introduced to represent this uncertainty.

The evidence from a radar sensor at a particular instant in time about a state is called the "instantaneous mass" of the state. Evidential grid mapping algorithms iteratively process the instantaneous mass for a particular time with instantaneous masses at prior times to formulate a more accurate grid map. Some evidential grid mapping algorithms struggle to distinguish artifacts due to noise in the radar sensor data, for example, from artifacts due to dynamic objects in the radar sensor data, which reduces the quality of the resulting representation of the environment. In addition, some evidential grid mapping algorithms do not account for sensor characteristics in determining the probability that a cell is in a free, dynamic, or static-dynamic state. For example, the antenna gain pattern of a radar sensor can vary over azimuth angle, which influences the reliability and/or accuracy of measured radar data points in determining the probability that a cell is in free, dynamic, or static-dynamic state.

SUMMARY

An apparatus comprises an inverse radar sensor model processor and a grid mapping processor. The inverse radar sensor model processor receives radar sensor data for a time k from a radar sensor and generates object data for the time k based on the radar sensor data. The inverse radar sensor model processor calculates and outputs instantaneous masses at the time k for each cell in a field of view (FOV) of the radar sensor based on the object data for the time k and a sensor characteristic. The grid mapping processor receives the calculated instantaneous masses for each cell in the FOV at the time k and accumulated masses for each cell in the FOV for a time period 0:k−1 prior to the time k. An accumulated mass for a cell in the FOV for the time period 0:k−1 represents a combination of instantaneous masses for the cell at each time increment in the time period 0:k−1. The grid mapping processor generates, for each cell in the FOV, updated accumulated masses for a time period 0:k based on the calculated instantaneous masses for the time k and the accumulated masses for the time period 0:k−1.

In some embodiments, the radar sensor data for the time k comprises point cloud data, and each data point in the point cloud data comprises a range with respect to the radar sensor, an azimuth angle with respect to the radar sensor, and a radial velocity with respect to the radar sensor. The apparatus further comprises a motion sensor, a motion calculator, and a motion compensator in some implementations. The motion sensor outputs motion data for the apparatus at the time k, and the motion calculator receives the motion data and determines calculated motion data based on the motion data. The motion compensator receives the calculated motion data and the radar sensor data for the time k and adjusts the radial velocity of each data point in the point cloud data based on the calculated motion data.

The inverse radar sensor model processor comprises an object level data calculator and an instantaneous mass calculator in some embodiments. The object level data calculator receives the radar sensor data for the time k and the adjusted radial velocity data, and generates the object data for the time k. The instantaneous mass calculator receives the object data for the time k and calculates the instantaneous masses at the time k for each cell in the FOV based on the object data for the time k, the adjusted radial velocity data, and the sensor characteristic. The instantaneous mass calculator then outputs the calculated instantaneous masses at the time k.

In some implementations, the sensor characteristic is at least one of an antenna gain as a function of angle with respect to the radar sensor, an antenna gain as a function of range with respect to the radar sensor, a signal-to-noise ratio as a function of angle with respect to the radar sensor, and a signal-to-noise ratio as a function of range with respect to the radar sensor.

In some embodiments, the object data for the time k includes locations at which radar reflections are centered at the time k, and the instantaneous mass calculator calculates the instantaneous masses at the time k for each cell (i,j) in the FOV by determining a probability of occupancy Pocc (i,j;k) at the time k based on a range of the cell (i,j) from the locations at which the radar reflections are centered. The instantaneous mass calculator then determines a position of the cell (i,j) with respect to a position of the radar sensor and updates the Pocc(i,j;k) based on an ambiguity of the radar sensor data associated with the position of the cell (i,j). The instantaneous mass calculator determines whether the Pocc (i,j;k) satisfies an occupancy criterion Åocc. In response to the Pocc(i,j;k) not satisfying the ∈occ, the instantaneous mass calculator performs a first set of operations, and in response to the Pocc(i,j;k) satisfying the ∈occ, the instantaneous mass calculator performs a second set of operations.

While performing the first set of operation in some implementations, the instantaneous mass calculator determines whether the position of the cell (i,j) is between the position of the radar sensor and a position of a cell (a,b) with a corresponding Pocc(a, b; k) that satisfies the ∈occ. In response to the position of the cell (i,j) not being between the radar sensor and the position of the cell (a,b), the instantaneous mass calculator calculates an instantaneous mass for a free state with low confidence and sets an instantaneous mass for a static-dynamic state and an instantaneous mass for a dynamic state to zero. In response to the position of the cell (i,j) being between the radar sensor and the position of the cell (a,b), the instantaneous mass calculator calculates the instantaneous mass for the free state with high confidence and sets the instantaneous mass for the static-dynamic state and the instantaneous mass for the dynamic state to zero.

The instantaneous mass $m_{(i,j;k)}(F)$ for the free state of a cell (i,j) at the time k with low confidence is represented as:

$$m_{(i,j;k)}(F) = p^{f,1} * w^{f,1}(\theta_{i,j}) * w^{f,1}(r_{i,j})$$

where $\theta_{i,j}$ represents an angle of the position of the cell (i,j) with respect to the position of the radar sensor, $r_{i,j}$ represents a range of the position of the cell (i,j) with respect to the position of the radar sensor, $p^{f,1}$ represents a constant, $w^{f,1}(\theta_{i,j})$ represents a first weight based on the sensor characteristic associated with the angle $\theta_{i,j}$, and $w^{f,1}(r_{i,j})$ represents a second weight based on the sensor characteristic associated with the range $r_{i,j}$.

The instantaneous mass $m_{(i,j;k)}(F)$ for the free state of a cell (i,j) at the time k with high confidence is represented as:

$$m_{(i,j;k)}(F) = p^{f,2} * w^{f,2}(\theta_{i,j}) * w^{f,2}(r_{i,j})$$

where $\theta_{i,j}$ represents an angle of the cell position with respect to the position of the radar sensor, $r_{i,j}$ represents a range of the cell position with respect to the position of the radar sensor, $p^{f,2}$ represents a constant, $w^{f,2}(\theta_{i,j})$ represents a first weight based on the sensor characteristic associated with the angle $\theta_{i,j}$, and $w^{f,2}(r_{i,j})$ represents a second weight based on the sensor characteristic associated with the range $r_{i,j}$.

While performing the second set of operation in some implementations, the instantaneous mass calculator determines whether an adjusted radial velocity associated with the cell (i,j) satisfies a velocity criterion $\in v$. In response to the adjusted radial velocity not satisfying the $\in v$, the instantaneous mass calculator calculates an instantaneous mass for a static-dynamic state and sets an instantaneous mass for a free state and an instantaneous mass for a dynamic state to zero. In response to the adjusted radial velocity satisfying the $\in v$, the instantaneous mass calculator calculates the instantaneous mass for the dynamic state and sets the instantaneous mass for the free state and the instantaneous mass for the static-dynamic state to zero.

The instantaneous mass $m_{(i,j;k)}(SD)$ for the static-dynamic state of a cell (i,j) at the time k is represented as:

$$m_{(i,j;k)}(SD) = \text{Pocc}(i,j;k) * \text{pocc}(\text{radar})$$

where pocc(radar) represents a weight based on the sensor characteristic. The instantaneous mass $m_{(i,j;k)}(D)$ for the dynamic state of a cell (i,j) at the time k is represented as:

$$m_{(i,j;k)}(D) = \text{Pocc}(i,j;k) * \text{pocc}(\text{radar})$$

where pocc(radar) represents a weight based on the sensor characteristic.

BRIEF DESCRIPTION OF THE DRAWINGS

For a detailed description of various examples, reference will now be made to the accompanying drawings in which:

FIG. 1 shows a block diagram of an example evidential grid mapping system.

FIG. 2 shows a block diagram of an example inverse radar sensor model processor for the evidential grid mapping system shown in FIG. 1.

DETAILED DESCRIPTION

Figure 3A:
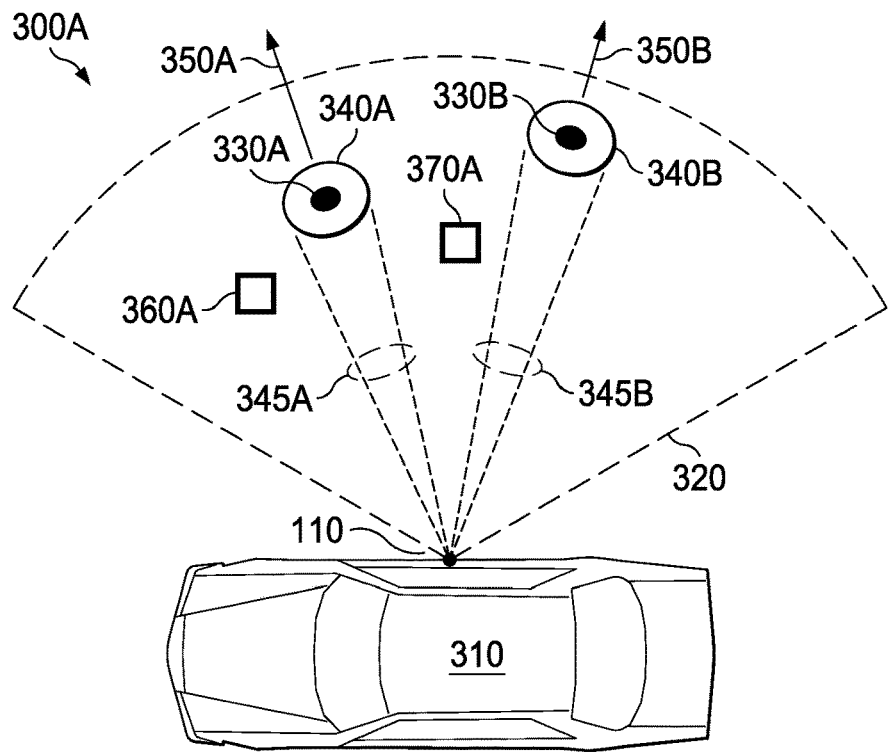
FIGS. 3A-D illustrate example scenarios for an inverse radar sensor model processor shown in FIG. 2.

The grid mapping system described herein includes a radar sensor, an inverse radar sensor model processor, and a grid mapping processor. The radar sensor outputs sensor data, such as point cloud data with range, azimuth angle, radial velocity, and an associated reflectivity or an associated signal-to-noise ratio for each point, to the inverse radar sensor model processor, which generates object data representative of locations in two-dimensional space at which the radar reflections are centered based on the sensor data. The inverse radar sensor model processor then calculates instantaneous masses for each cell in a field of view of the radar sensor based on the object data and a sensor characteristic. The instantaneous masses for each cell can be determined based on a probability of occupancy for the cell, a radial velocity for the cell, and the sensor characteristic associated with the position of the cell. The grid mapping processor then iteratively processes the calculated instantaneous mass for each cell at a particular time with instantaneous masses from prior times to generate an accumulated mass and a more accurate grid map.

FIG. 1 illustrates a block diagram of an example evidential grid mapping system 100, which includes a radar sensor 110, a motion sensor 120, a motion calculator 130, a motion compensator 180, an inverse radar sensor model processor 140, a grid mapping processor 150, and a feedback loop 165. The radar sensor 110 includes an output 112 and generates sensor data 115 based on the environment 105. The sensor data 115 can be point cloud data with a range, azimuth angle, radial velocity, and an associated reflectivity or an associated signal-to-noise ratio for each point in the point cloud. The radar sensor output 112 is coupled to an input 117 of the inverse radar sensor model processor 140 and to an input 184 of the motion compensator 180. The motion sensor 120 includes an output 122 and generates motion data 125 that describes the movement of the system 100. The motion sensor 120 can be any appropriate kind of motion sensor, such as an inertial measurement unit, an accelerometer, a geomagnetic field sensor, global navigation satellite system, global positioning system, and the like, or any combination thereof.

The motion calculator 130 receives the motion data 125 at an input 127 and determines calculated motion data 135, such as the position, the velocity, and the attitude of the system 100. An output 132 of the motion calculator 130 is coupled to an input 182 of the motion compensator 180, and the motion compensator 180 compensates a radial velocity for each radar measurement in the sensor data 115 to account for the estimated motion of the radar sensor 110. For example, the system 100 is mounted in a vehicle as part of a driver assistance system, and the motion compensator 180 compensates the radial velocities based on the calculated motion data 135 to account for at least some of the vehicle motion.

An output 186 of the motion compensator 180 is coupled to an input 137 of the inverse radar sensor model processor 140 and provides the compensated motion data 188 to the inverse radar sensor model processor 140. The inverse radar sensor model processor 140 calculates an instantaneous mass for each cell in the grid mapping based on the sensor data 115 and the compensated motion data 188 and outputs the instantaneous masses 145 through an output 142. An input 147 of the grid mapping processor 150 is coupled to the output 142 of the inverse radar sensor model processor 140, and receives the instantaneous masses 145. The grid mapping processor 150 processes the instantaneous masses 145 with prior instantaneous masses to update an accumulated grid mapping and outputs the accumulated masses 155 through an output 152. The accumulated masses 155 can be used to generate an approximate representation of the environment 160.

In turn, the approximate representation of the environment 160 can be used by other system to provide alerts, update parameters, and perform other actions. Returning to the example in which the system 100 is mounted in a vehicle as part of a driver assistance system, the approximate representation of the environment 160 can be used to identify obstacles such as parked and moving vehicles, pedestrians, bicyclists, and the like; present driver alerts such as a proximity alert; adjust a vehicle speed during a parking assistance operation; and the like. The feedback loop 165 receives the accumulated masses 155 at an input 162 and determines feedback data 170 for the grid mapping processor 150. An output 167 of feedback loop 165 is coupled to an input 172 of the grid mapping processor 150 to provide the feedback data 170.

FIG. 2 shows a block diagram 200 of an example inverse radar sensor model processor 140 for the evidential grid mapping system shown in FIG. 1. The example inverse radar sensor model processor 140 includes an object level data calculator 220 and an instantaneous mass calculator 240. The object level data calculator 220 has an input 205 for the sensor data 115, an input 210 for the calculated motion data 135, and an output 215 for the object data 225. The object level data calculator 220 generates the object data 225 based on the sensor data 115 and the calculated motion data 135. The object data 225 includes locations in two-dimensional (2D) space at which the sensor data 115 indicates the radar reflections are centered, the compensated radial velocity at those locations, and the ambiguity of the measurements as a signal-to-noise ratio (SNR).

The output 215 of the object level data calculator 220 is coupled to an input 230 of the instantaneous mass calculator 240. The instantaneous mass calculator 240 computes the instantaneous mass for each cell being free (F), occupied by a dynamic object (D), or occupied by an object that might be moving or stationary (SD). For each cell (i,j), the instantaneous mass calculator 240 uses the probability of occupancy Pocc(i,j) based on the object level data, the position of the cell with respect to the radar sensor and other cells with a positive probability of occupancy, and the radial velocity for the cell. The accuracy of the sensor data 115 varies based on the position (i,j) of the cell with respect to the radar sensor 110, and the position (i,j) of the cell with respect to other occupied cells can identify occlusions by objects in between the particular location and the radar sensor 110. An example process for calculating the instantaneous mass is described further herein with respect to FIG. 4. The instantaneous mass calculator 240 outputs the instantaneous masses 145 through an output 235 to the grid mapping processor 150.

Table 1 summarizes the scenarios 300 shown in FIGS. 3A-D. The scenarios 300A-D show the radar sensor 110 mounted in a vehicle 310 and the corresponding field of view (FOV) 320. Within the FOV 320, radar sensor 110 detects radar reflections 330A and 330B with compensated radial velocities indicated by arrows 350A and 350B, respectively. The longer arrow 350A indicates a greater compensated radial velocity than the shorter arrow 350B. The region 340A around the radar reflection 330A represents the particular cells that are considered "occupied" based on the radar reflection 330A and the corresponding probability of occupancy. The region 340B around the radar reflection 330B represents the particular cells that are considered "occupied" based on the radar reflection 330B and the corresponding probability of occupancy.

$v(i,j;k)$ represents the compensated radial velocity associated with a cell (i,j) at a time k. The first entry in table 1 corresponds to the scenario 300A shown in FIG. 3A, in which the cells 360A and 370A are unoccupied and not between the radar sensor 110 and the occupied cells in regions 340A and 340B. That is, the probability of occupancy Pocc(i,j;k) for each of cells 360A and 370A does not satisfy a threshold occupancy criterion $\in$occ, and the compensated radial velocity $v(i,j;k)$ for each of cells 360A and 370A is equal to zero. For example, Pocc(i,j;k) can be less than or equal to $\in$occ. The instantaneous mass calculator 240 calculates the instantaneous mass $m_{(i,j;k)}(F)$ for a free cell with low confidence $p^{f,1}$ and sets the instantaneous masses $m_{(i,j;k)}(D)$ for a dynamic cell and $m_{(i,j;k)}(SD)$ for a static-dynamic cell to zero.

Figure 3B:
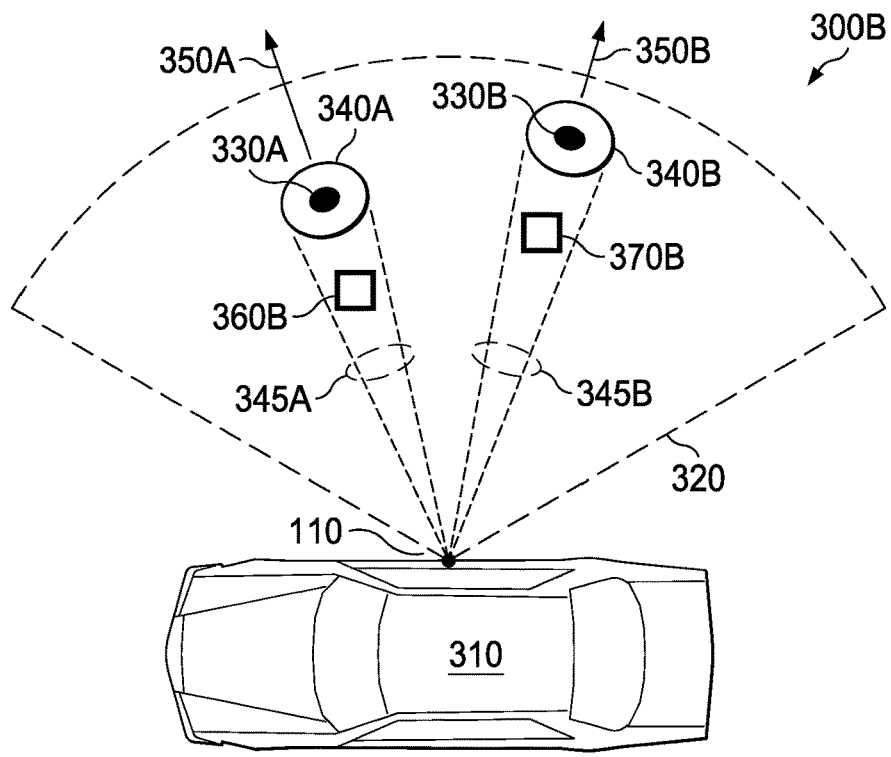

The second entry in table 1 corresponds to the scenario 300B shown in FIG. 3B, in which the cells 360B and 370B are unoccupied and between the radar sensor 110 and the occupied cells in regions 340A and 340B. That is, the probability of occupancy Pocc(i,j;k) for each of cells 360B and 370B does not satisfy a threshold occupancy criterion $\in$occ, and the compensated radial velocity $v(i,j;k)$ for each of cells 360B and 370B is equal to zero. For example, Pocc(i,j;k) can be less than or equal to $\in$occ. The instantaneous mass calculator 240 calculates the instantaneous mass $m_{(i,j;k)}(F)$ for a free cell with high confidence $p^{f,2}$ and sets the instantaneous masses $m_{(i,j;k)}(D)$ for a dynamic cell and $m_{(i,j;k)}(SD)$ for a static-dynamic cell to zero.

Figure 3C:
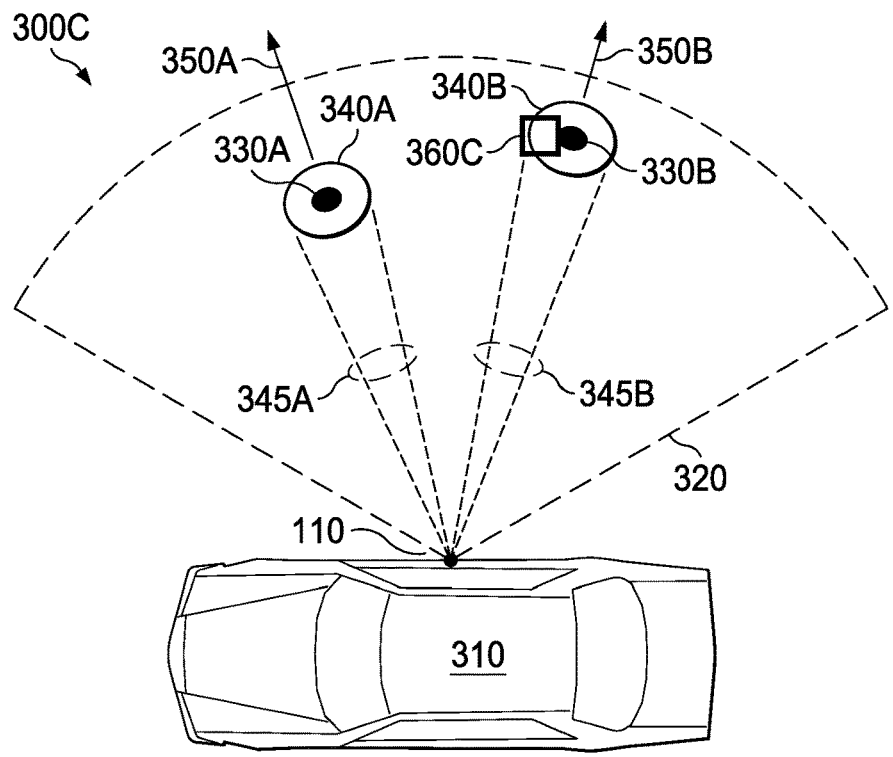

The third entry in table 1 corresponds to scenario 300C shown in FIG. 3C, in which the cell 360C is occupied in region 340B but has a compensated radial velocity 350B that does not satisfy a threshold velocity criterion $\in$v. That is, the probability of occupancy Pocc(i,j;k) for cell 360C satisfies a threshold occupancy criterion $\in$occ, and the compensated radial velocity $v(i,j;k)$ for cell 360C does not satisfy a threshold velocity criterion $\in$v. For example, Pocc(i,j;k) can be greater than $\in$occ, and $v(i,j;k)$ can be less than or equal

TABLE 1

Figure 3D:
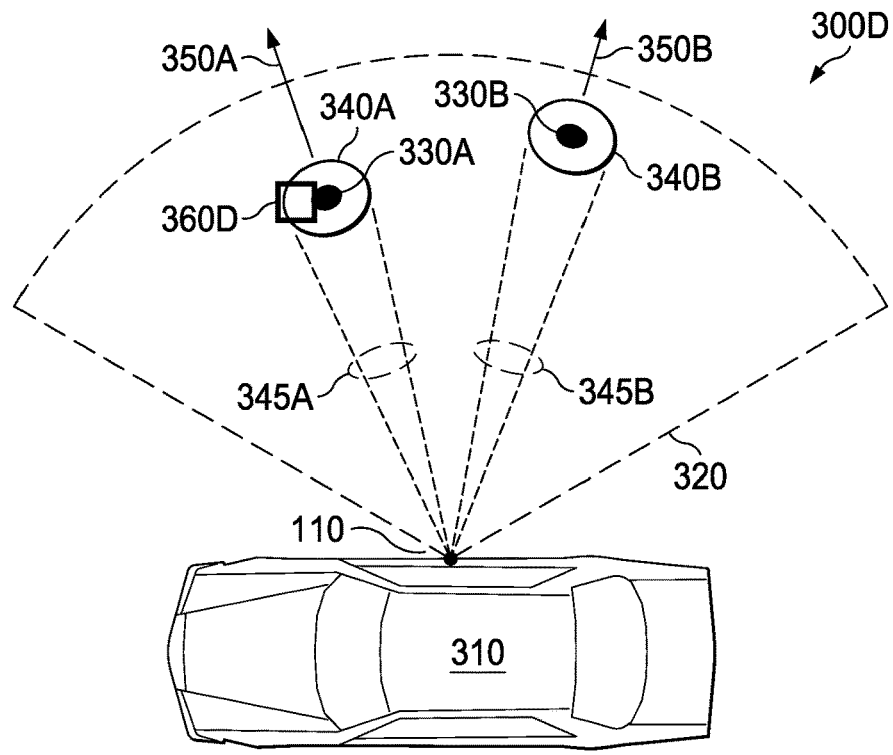

| | Scenario | $m_{i,j;k}(D)$ | $m_{i,j;k}(SD)$ | $m_{i,j;k}(F)$ |
|---|---|---|---|---|
| Pocc(i, j; k) $\leq$ $\in$occ<br>v(i, j; k) = 0 | Scenario 300A shown in FIG. 3A | 0 | 0 | $p^{f,1}$<br>$* w^{f,1}(\theta_{i,j;k})$<br>$* w^{f,1}(r_{i,j;k})$ |
| Pocc(i, j; k) $\leq$ $\in$occ<br>v(i, j; k) = 0 | Scenario 300B shown in FIG. 3B | 0 | 0 | $p^{f,2}$<br>$* w^{f,2}(\theta_{i,j})$<br>$* w^{f,2}(r_{i,j})$ |
| Pocc(i, j; k) > $\in$occ<br>v(i, j; k) $\leq$ $\in$v | Scenario 300C shown in FIG. 3C | 0 | Pocc(i, j; k) | 0 |
| Pocc(i, j; k) > $\in$occ<br>v(i, j; k) > $\in$v | Scenario 300D shown in FIG. 3D | Pocc(i, j; k) | 0 | 0 | to ∈v. The instantaneous mass calculator 240 calculates the instantaneous mass $m_{(i,j;k)}(SD)$ for a static-dynamic cell and sets the instantaneous masses $m_{(i,j;k)}(D)$ for a dynamic cell and $m_{(i,j;k)}(F)$ for a free cell to zero.

The fourth entry in table 1 corresponds to scenario 300D shown in FIG. 3D, in which the cell 360D is occupied in region 340A with a compensated radial velocity 350A that satisfies ∈v. That is, the probability of occupancy Pocc(i,j;k) for cell 360D satisfies a threshold occupancy criterion ∈occ, and the compensated radial velocity v(i,j;k) for cell 360D satisfies the threshold velocity criterion ∈v. For example, Pocc(i,j;k) can be greater than ∈occ, and v(i,j;k) can be greater than ∈v. The instantaneous mass calculator 240 calculates the instantaneous mass $m_{(i,j;k)}(D)$ for a dynamic cell and sets the instantaneous masses $m_{(i,j;k)}(SD)$ for a static-dynamic cell and $m_{(i,j;k)}(F)$ for a free cell to zero.

Figure 4:
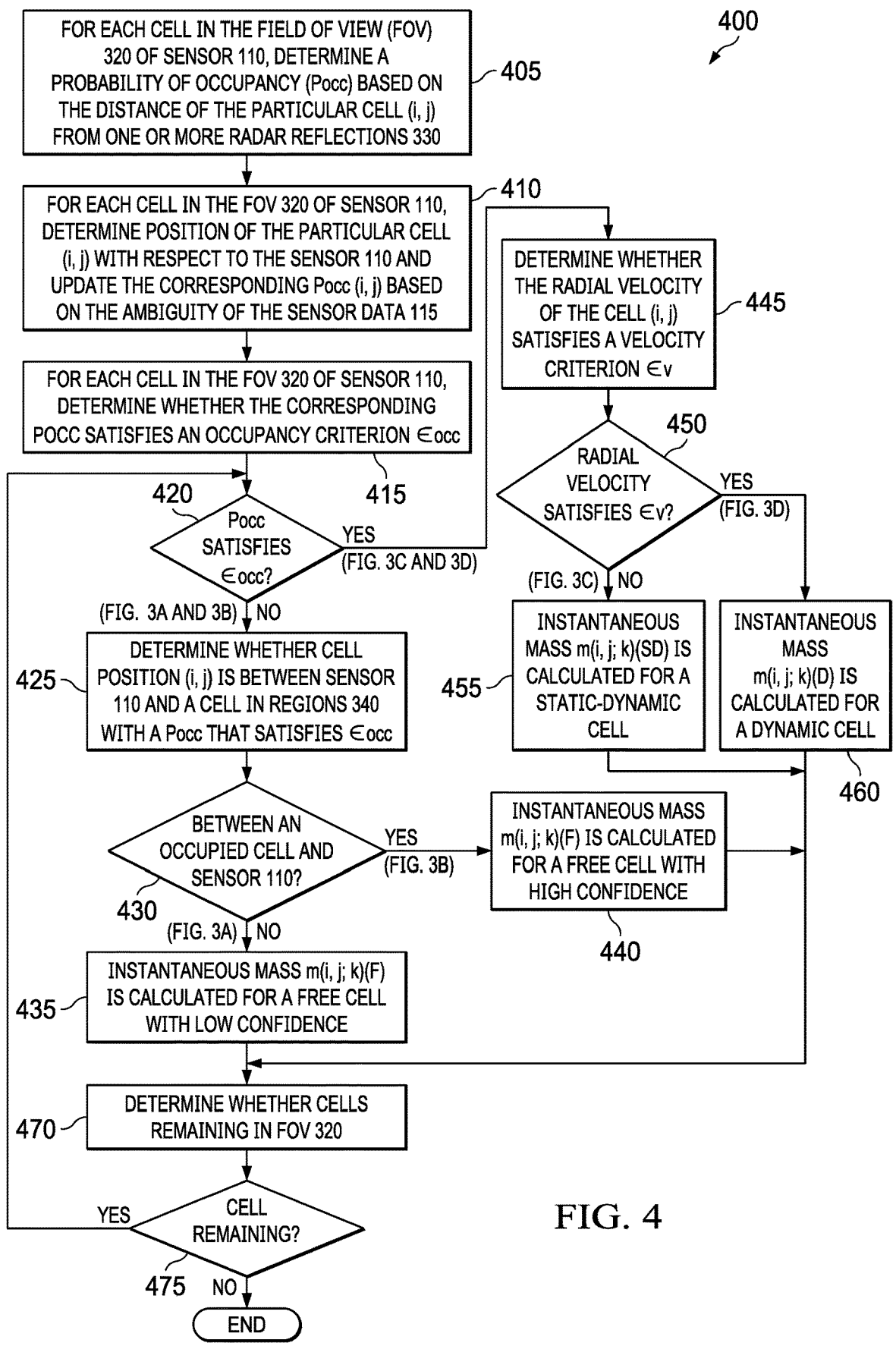
FIG. 4 illustrates, in flowchart form, an example process for calculating instantaneous masses.

FIG. 4 illustrates, in flowchart form, an example process 400 for calculating instantaneous masses. The process 400 is performed by a processing unit executing instructions stored in a non-transitory computer-readable medium, such as a static random access memory (SRAM). For example, the process 400 can be performed by the instantaneous mass calculator 240 described above with reference to FIG. 2 executing instructions stored in SRAM. For ease of explanation, the process 400 is described herein with reference to the grid mapping system 100 shown in FIG. 1, the inverse radar sensor model processor shown in FIG. 2, and scenarios 300A-D shown in FIGS. 3A-D.

The process 400 begins at step 405, where the instantaneous mass calculator 240 determines, for each cell (i,j) in the FOV 320 of the radar sensor 110, a probability of occupancy Pocc(i,j) based on the distance of the particular cell (i,j) from the radar reflections 330A and 330B indicated in the sensor data 115. For example, the probability of occupancy Pocc(i,j) at a time k can be represented with a two-dimensional Gaussian probability density in polar coordinates as follows:

$$P_{i,j;k}^{occ} = 1_{\{\tilde{P}_{i,j;k}^{occ} > \epsilon_{occ}\}} \tilde{P}_{i,j;k}^{occ}$$

where $$\tilde{P}_{i,j;k}^{occ} = \frac{a^2}{|\partial R_{i,j;k}|} \left\{ \sum_{l_m \in \partial R_{i,j;k}} \frac{1}{2\pi |\Sigma_{l_m}|} \exp\left\{ -\frac{1}{2}(c_{l_m} - c_{i,j})^t \Sigma_{l_m}^{-1} (c_{l_m} - c_{i,j}) \right\} \right\}$$

The expression $1_{\{\tilde{P}_{i,j;k}^{occ} > \epsilon_{rad}\}}$ is an indicator function equal to one while the probability of occupancy Pocc(i,j) is greater than a threshold occupancy criterion $\epsilon_{occ}$ and zero otherwise, $\alpha^2$ represents the area of the cell (i,j), $R_k = \{l_1, \ldots l_{N_k}\}$ are radar measurements made at the time k, $\partial R_{i,j;k} \subseteq R_k$ are a subset of the measurements $R_k$ that are within a predefined distance from the cell (i,j), $c_{l_m}$ are the two-dimensional polar coordinates (that is, the range and azimuth angle) of a radar measurement $l_m$, $c_{i,j}$ are the two-dimensional polar coordinates of the cell (i,j) with respect to the radar sensor 110, $$\Sigma_{l_m} = \begin{bmatrix} \sigma_{r,l_m}^2 & 0 \\ 0 & \sigma_{\theta,l_m}^2 \end{bmatrix}$$

and $\sigma_{r,l_m}^2$, $\sigma_{\theta,l_m}^2$ are the variances of the radar measurement $l_m$ in a range r and an angle θ. The predefined distance from the cell (i,j) can be the Euclidean distance from the cell, in some implementations.

Figure 5:
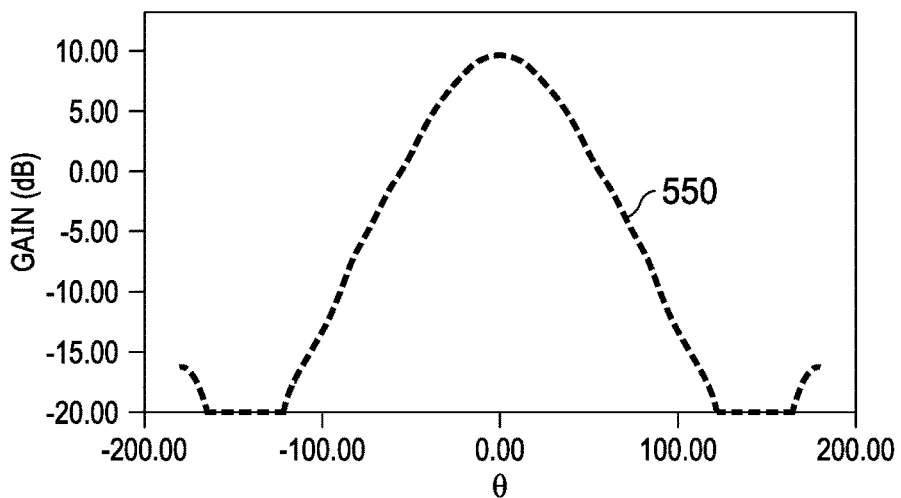
FIG. 5 shows a graph of an antenna gain pattern over azimuth angle for an example radar sensor included in the evidential grid mapping system shown in FIG. 1.

At step 410, the instantaneous mass calculator 240 determines, for each cell (i,j) in the FOV 320, a position of the cell with respect to the sensor 110 and updates the corresponding Pocc(i,j) based on the ambiguity of the sensor data 115. The SNR of the radar sensor 110 can vary with respect to the angle and distance from the radar sensor 110, and thus the ambiguity of the sensor data 115 varies with respect to the angle and distance as well. FIG. 5 shows a graph 500 of radar sensor gain 550 over azimuth angle, which varies by several tens of decibels (dB) across the azimuth angles and influences the SNR of the radar sensor 110 accordingly.

Returning to FIG. 4, at step 415 the instantaneous mass calculator 240 determines, for each cell (i,j) in the FOV 320, whether the corresponding Pocc(i,j) satisfies an occupancy criterion ∈occ. For example, the occupancy criterion ∈occ may represent a threshold probability of 70%, such that a cell (i,j) is considered occupied in response to the corresponding probability of occupancy Pocc(i,j) being greater than 70%. If the Pocc(i,j) does not satisfy the occupancy criterion ∈occ at step 420, it is likely the cell is free. FIGS. 3A and 3B illustrate scenarios 300A and 300B in which the cells 360A and 370A and 360B and 370B, respectively, are not included in the regions 340A and 340B of cells around the radar reflections 330A and 330B with Pocc(i,j) that satisfy ∈occ. Thus, cells 360A and 370A and 360B and 370B in scenarios 300A and 300B, respectively, are likely free.

The instantaneous mass calculator 240 proceeds to step 425 and determines whether the cell position (i,j) is in the path 345A between the sensor 110 and an occupied cell in the region 340A or in the path 345B between the sensor 110 and an occupied cell in the region 340B. For example, the instantaneous mass calculator 240 can compare the azimuth angle $\theta_{i,j}$ of the cell with respect to the radar sensor 110 to the azimuth angle $\theta_{330A}$ of the radar reflection 330A and the azimuth angle $\theta_{330B}$ of the radar reflection 330B with respect to the radar sensor 110. The instantaneous mass calculator 240 can determine a range of angles $[\theta_{330A}-\epsilon_{\theta A}, \theta_{330A}+\epsilon_{\theta A}]$ around the radar reflection 330A and a range of angles $[\theta_{330B}-\epsilon_{\theta B}, \theta_{330B}+\epsilon_{\theta B}]$ around the radar reflection 330B, where $\epsilon_{\theta A}$ is chosen to represent the azimuth angle for a cell at the edge of the radar reflection 330A with a Pocc that satisfies ∈occ and $\epsilon_{\theta B}$ is chosen to represent the azimuth angle for a cell at the edge of the radar reflection 330B with a Pocc that satisfies ∈occ. The instantaneous mass calculator 240 can then determine whether the azimuth angle $\theta_{i,j}$ of the cell is within the range of angles $[\theta_{330A}-\epsilon_{\theta A}, \theta_{330A}++\epsilon_{\theta A}]$ or $[\theta_{330B}-\epsilon_{\theta B}, \theta_{330B}+\epsilon_{\theta B}]$.

If the cell is not between an occupied cell and the sensor 110 at step 430, as illustrated in scenario 300A in FIG. 3A, the instantaneous mass calculator 240 calculates the instantaneous mass $m_{(i,j;k)}(F)$ for a free cell (F) at a cell position (i,j) and a time k with low confidence $p^{f,1}$ at step 435. The instantaneous mass $m_{(i,j;k)}(D)$ for a dynamic cell (D) and the instantaneous mass $m_{(i,j;k)}(SD)$ for a static-dynamic cell (SD) at the cell position (i,j) and the time k are set to zero.

For example, the instantaneous mass $m_{(i,j;k)}(F)$ with a low confidence $p^{f,1}$ can be represented as:

$$m_{(i,j;k)}(F) = p^{f,1} * w^{f,1}(\theta_{i,j}) * w^{f,1}(r_{i,j})$$

where $p^{f,1}$ represents a constant between zero and one, $w^{f,1}(\theta_{i,j})$ represents a first weight based on the gain of the sensor 110 at the particular angle $\theta_{i,j}$ of the cell position with respect to the sensor 110, and $w^{f,1}(r_{i,j})$ represents a second weight based on the gain of the radar sensor 110 at the particular range $r_{i,j}$ of the cell position with respect to the radar sensor 110. The weights $w^{f,1}(\theta_{i,j})$ and $w^{f,1}(r_{i,j})$ can be looked up from a table based on the known behavior of the gain of the radar sensor 110.

In some implementations, the first weight $w^{f,1}(\theta_{i,j})$ is a function based on the radar sensor gain 550 over azimuth angle $\theta_{i,j}$ as shown in FIG. 5, normalized to a number between zero and one. For example, the first weight $w^{f,1}(\theta_{i,j})$ can be represented as:

$$w^{f,1}(\theta_{i,j}) = \begin{cases} \cos\left(\frac{|\theta_{i,j}|*90}{\theta_{max}}\right) & \text{if } \theta_{i,j} \leq \theta_{max} \\ 0 & \text{otherwise} \end{cases}$$

where $\theta_{max}$ represents the angles of the edges of the FOV 320 for sensor 110. In some implementations, the second weight $w^{f,1}(r_{i,j})$ is a function in which the weight $w^{f,1}$ decreases monotonically with range $(r_{i,j})$. For example, the second weight $w^{f,1}(r_{i,j})$ can be based on the radar sensor gain over range, and represented as:

$$w^{f,1}(r_{i,j}) = \begin{cases} 1 & \text{if } (r_{i,j}) < r_1 \\ e^{-b[(r_{i,j})-r_{max}]} & \text{if } r_1 \leq (r_{i,j}) \leq r_{max} \\ 0 & \text{otherwise} \end{cases}$$

where $r_1$ represents a range of an object, $r_{max}$ represents a maximum range for the sensor 110, and b represents a constant chosen based on the characteristics of sensor 110.

Returning to step 430, if the cell is between an occupied cell and the radar sensor 110, as illustrated in scenario 300B in FIG. 3B, the instantaneous mass calculator 240 calculates the instantaneous mass $m_{(i,j;k)}(F)$ for a free cell (F) at a cell position (i,j) and a time k with high confidence $p^{f,2}$ at step 440. The cell 360B is in path 345A between the radar sensor 110 and the occupied region 340A, and the cell 370B is in path 345B between the radar sensor 110 and the occupied region 340B. If the cells 360B and 370B were occupied, that is, not free, the cells would occlude the occupied regions 340A and 340B, respectively. Since the occupied regions 340A and 340B are not occluded, there is a high confidence $^{f,2}$ that the cells 360B and 370B are free. The instantaneous mass $m_{(i,j;k)}(D)$ and the instantaneous mass $m_{(i,j;k)}(SD)$ at the cell position (i,j) and the time k are set to zero.

For example, the instantaneous mass $m_{(i,j;k)}(F)$ with high confidence $p^{f,2}$ can be represented as:

$$m_{(i,j;k)}(F)=p^{f,2}*w^{f,2}(\theta_{i,j})*w^{f,2}(r_{i,j})$$

where $p^{f,2}$ represents a constant greater than $p^{f,1}$ and less than one, $w^{f,2}(\theta_{i,j})$ represents a third weight based on the gain of the sensor 110 at the particular angle $\theta_{i,j}$ of the cell position with respect to the sensor 110, and $w^{f,2}(r_{i,j})$ represents a fourth weight based on the gain of the radar sensor 110 at the particular range $r_{i,j}$ of the cell position with respect to the radar sensor 110. The weights $w^{f,2}(\theta_{i,j})$ and $w^{f,2}(r_{i,j})$ can be looked up from a table based on the known behavior of the gain of the radar sensor 110. Because there is a higher confidence in step 340 than at step 335, the constant $p^{f,2}$ is greater than the constant $p^{f,1}$ used in calculating the instantaneous mass $m_{(i,j;k)}(F)$ with low confidence. In addition, the weights $w^{f,2}(\theta_{i,j})$ and $w^{f,2}(r_{i,j})$ are normalized to a larger number between zero and one than the weights $w^{f,1}(r_{i,j})$ and $w^{f,1}(r_{i,j})$.

Returning to step 420, if the Pocc(i,j) satisfies the occupancy criterion ∈ occ, it is likely the cell is occupied. FIGS. 3C and 3D illustrate scenarios 300C and 300D in which the cells 360C and 360D, respectively, are included in the regions 340A and 340B of cells around the radar reflections 330A and 330B with Pocc(i,j) that satisfy ∈ occ. Thus, cells 360C and 360D in scenarios 300C and 300D, respectively, are likely occupied. The instantaneous mass calculator 240 proceeds to step 445 and determines whether the compensated radial velocity of the cell satisfies a velocity criterion ∈ v. For example, the instantaneous mass calculator 240 determines whether the compensated radial velocity v(i,j;k) is greater than ∈ v.

If the compensated radial velocity does not satisfy ∈ v at step 450, for example, the compensated radial velocity is less than or equal to ∈ v as illustrated in scenario 300C shown in FIG. 3C, the instantaneous mass calculator 240 calculates the instantaneous mass $m_{(i,j;k)}(SD)$ for a static-dynamic cell at a cell position (i,j) and a time k at step 455. The cell 360C is included in the region 340B associated with the lower radial velocity 350B, and thus, the compensated radial velocity associated with the cell 360C does not satisfy ∈ v and the instantaneous mass calculator 240 cannot be certain whether the object occupying cell 360C is static or dynamic. For example, the instantaneous mass $m_{(i,j;k)}(SD)$ can be represented as:

$$m_{(i,j;k)}(SD)=Pocc(i,j;k)*\rho occ(radar)$$

where ρocc(radar) represents a fifth weight based on the overall SNR of the radar sensor 110. The instantaneous mass $m_{(i,j;k)}(D)$ for a dynamic cell and the instantaneous mass $m_{(i,j;k)}(F)$ for a free cell at the cell position (i,j) and the time k are set to zero.

Returning to step 450, if the compensated radial velocity satisfies the velocity criterion ∈ v, for example, the compensated radial velocity is greater than ∈ v as illustrated in scenario 300D in FIG. 3D, the instantaneous mass calculator 240 calculates the instantaneous mass $m_{(i,j;k)}(D)$ for a dynamic cell (D) at a cell position (i,j) and a time k at step 460. The cell 360D is included in the region 340A associated with the higher radial velocity 350A, and thus, the compensated radial velocity associated with the cell 360D satisfies ∈ v and the instantaneous mass calculator 240 has a high confidence that the object occupying cell 360D is moving. For example, the instantaneous mass $m_{(i,j;k)}(D)$ can be represented as:

$$m_{(i,j;k)}(D)=Pocc(i,j;k)*\rho occ(radar)$$

The instantaneous mass $m_{(i,j;k)}(SD)$ for a static-dynamic cell and the instantaneous mass $m_{(i,j;k)}(F)$ for a free cell at the cell position (i,j) and the time k are set to zero.

From each of steps 435, 440, 455, and 460, the instantaneous mass calculator 240 proceeds to step 470 and determines whether there are cells remaining in the FOV 320. If there are cells remaining at step 475, the instantaneous mass calculator 240 returns to step 420 and iterates through the remaining steps of process 400 until an instantaneous mass has been calculated for each cell in the FOV 320. Once there are no cells remaining at step 465, the process 400 ends and the instantaneous mass calculator 240 outputs the instantaneous masses 145 to the grid mapping processor 150.

Figure 6:
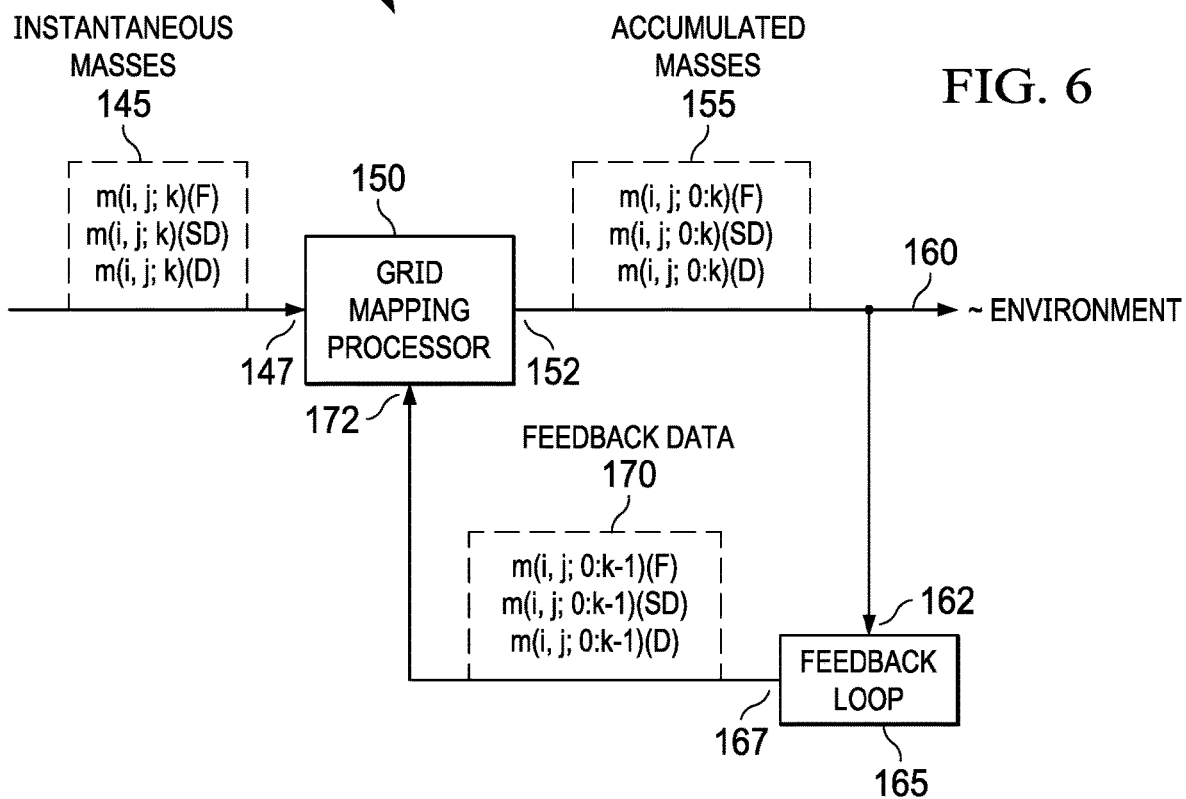
FIG. 6 shows an example data flow for the grid mapping processor shown in FIG. 1.

FIG. 6 illustrates an example data flow 600 for the grid mapping processor 150 shown in FIG. 1. The grid mapping processor 150 receives the instantaneous masses 145 at input 147. The instantaneous masses 145 include the instantaneous mass for the free state $m_{(i,j;k)}(F)$, the instantaneous mass for the static-dynamic state $m_{(i,j;k)}(SD)$, and the instantaneous mass for the dynamic state $m_{(i,j;k)}(D)$. The grid mapping processor 150 also receives the feedback data 170 at input 172. The feedback data 170 includes the accumulated masses of the cells, that is, the combined instantaneous masses, from previous time instances 0:k−1. That is, the feedback data 170 includes the prior accumulated mass for the free state $m_{(i,j;0:k-1)}(F)$, the prior accumulated mass for the static-dynamic state $m_{(i,j;0:k-1)}(SD)$, and the prior accumulated mass for the dynamic state $m_{(i,j;0:k-1)}(D)$ The grid mapping processor 150 generates the accumulated masses 155 for the cells at the present time k. That is, the grid mapping processor calculates the updated accumulated mass for the free state $m_{(i,j;0:k)}(F)$, the updated accumulated mass for the static-dynamic state $m_{(i,j;0:k)}(SD)$, and the updated accumulated mass for the dynamic state $m_{(i,j;0:k)}(D)$. The updated accumulated masses are calculated based on the instantaneous mass and the prior accumulated mass of an uncertain state (SDF) which represents the ambiguity of sensor data between the free state, dynamic state, and static-dynamic state.

The instantaneous mass of the uncertain state SDF $m_{(i,j;k)}(SDF)$ can be represented as:

$$m_{(i,j;k)}(SDF)=1-m_{(i,j;k)}(F)-m_{(i,j;k)}(D)-m_{(i,j;k)}(SD)$$

The prior accumulated mass of the uncertain state SDF $m_{(i,j;0:k-1)}(SDF)$ can be represented as:

$$m_{(i,j;0:k-1)}(SDF)=1-m_{(i,j;0:k-1)}(F)-m_{(i,j;0:k-1)}(D)-m_{(i,j;0:k-1)}(SD)$$

The updated accumulated mass for the free state $m_{(i,j;0:k)}(F)$ can be represented as:

$$m_{(i,j;0:k)}(F)=[m_{(i,j;k)}(F)][m_{(i,j;0:k-1)}(F)]+[m_{(i,j;k)}(F)][m_{(i,j;0:k-1)}(SDF)]+[m_{(i,j;k)}(SDF)][m_{(i,j;0:k-1)}(F)]$$

The updated accumulated mass for the static-dynamic state $m_{(i,j;0:k)}(SD)$ can be represented as:

$$m_{(i,j;0:k)}(SD)=[m_{(i,j;k)}(SD)][m_{(i,j;0:k-1)}(SD)]+[m_{(i,j;k)}(SD)][m_{(i,j;0:k-1)}(SDF)]+[m_{(i,j;k)}(SDF)][m_{(i,j;0:k-1)}(SD)]$$

The updated accumulated mass for the dynamic state $m_{(i,j;0:k)}(D)$ can be represented as:

$$m_{(i,j;0:k)}(D)=[m_{(i,j;k)}(D)][m_{(i,j;0:k-1)}(D)]+[m_{(i,j;k)}(SD)][m_{(i,j;0:k-1)}(D)]+[m_{(i,j;k)}(D)][m_{(i,j;0:k-1)}(SD)]+[m_{(i,j;k)}(SDF)][m_{(i,j;0:k-1)}(D)]+[m_{(i,j;k)}(D)][m_{(i,j;0:k-1)}(SDF)]$$

The instantaneous and prior accumulated masses of the static-dynamic state (SD) contribute to the updated accumulated mass of the dynamic state (D) because the static-dynamic state (SD) is an ambiguity whether a cell is stationary or dynamic. Accounting for this ambiguity enables the grid mapping processor 150 to change state from static-dynamic to dynamic more quickly, which makes the resulting representation of the environment 160 more accurate in the presence of moving objects.

While the system 100 described herein with reference to FIG. 1, the inverse radar sensor model processor 140 described herein with reference to FIG. 2, the scenarios 300A-D described herein with reference to FIGS. 3A-D, the process 400 described herein with reference to FIG. 4, and the data flow 600 described herein with reference to FIG. 6 use only a single radar sensor 110 and inverse radar sensor model processor 140, the grid mapping processor can accumulate instantaneous masses from any number of radar sensors with corresponding inverse radar sensor model processors. In addition, the grid mapping processor can accumulate instantaneous masses from radar sensors, cameras, light detection and ranging (lidar) sensors, or any combination thereof.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Modifications are possible in the described embodiments, and other embodiments are possible, within the scope of the claims.

What is claimed is:

1. An apparatus, comprising:
an inverse radar sensor model processor configured to:
receive radar sensor data for a time k from a radar sensor;
generate object data for the time k based on the radar sensor data;
calculate instantaneous masses at the time k for each cell in a field of view (FOV) of the radar sensor based on the object data for the time k and a sensor characteristic; and
output the calculated instantaneous masses for each cell in the FOV at the time k; and
a grid mapping processor configured to:
receive the calculated instantaneous masses for each cell in the FOV at the time k and accumulated masses for each cell in the FOV for a time period 0:k−1 prior to the time k, wherein an accumulated mass for a cell in the FOV for the time period 0:k−1 represents a combination of instantaneous masses for the cell at each time increment in the time period 0:k−1; and
generate, for each cell in the FOV, updated accumulated masses for a time period 0:k based on the calculated instantaneous masses for the time k and the accumulated masses for the time period 0:k−1.

2. The apparatus of claim 1, wherein the radar sensor data for the time k comprises point cloud data, wherein each data point in the point cloud data comprises a range with respect to the radar sensor, an azimuth angle with respect to the radar sensor, and a radial velocity with respect to the radar sensor.

3. The apparatus of claim 2, wherein the apparatus further comprises:
a motion sensor configured to output motion data for the apparatus at the time k;
a motion calculator configured to:
receive the motion data; and
determine calculated motion data based on the motion data; and
a motion compensator configured to:
receive the calculated motion data and the radar sensor data for the time k; and
adjust, for each data point in the point cloud data, the radial velocity based on the calculated motion data.

4. The apparatus of claim 3, wherein the inverse radar sensor model processor comprises:
an object level data calculator configured to:
receive the radar sensor data for the time k and the adjusted radial velocity data; and
generate the object data for the time k based on the radar sensor data for the time k and the adjusted radial velocity data; and an instantaneous mass calculator configured to:
 receive the object data for the time k;
 calculate the instantaneous masses at the time k for each cell in the FOV based on the object data for the time k, the adjusted radial velocity data, and the sensor characteristic; and
 output the calculated instantaneous masses at the time k.

5. The apparatus of claim 4, wherein the sensor characteristic comprises at least one of:
 an antenna gain as a function of angle with respect to the radar sensor, an antenna gain as a function of range with respect to the radar sensor, a signal-to-noise ratio as a function of angle with respect to the radar sensor, and a signal-to-noise ratio as a function of range with respect to the radar sensor.

6. The apparatus of claim 5, wherein the object data for the time k comprises locations at which radar reflections are centered at the time k, wherein the instantaneous mass calculator is configured to calculate the instantaneous masses at the time k for each cell in the FOV by being further configured to, for each cell (i,j) in the FOV:
 determine a probability of occupancy Pocc(i,j;k) at the time k based on a range of the cell (i,j) from the locations at which the radar reflections are centered;
 determine a position of the cell (i,j) with respect to a position of the radar sensor;
 update the Pocc(i,j;k) based on an ambiguity of the radar sensor data associated with the position of the cell (i,j);
 determine whether the Pocc(i,j;k) satisfies an occupancy criterion $\in occ$;
 in response to the Pocc(i,j;k) not satisfying the $\in occ$, perform a first set of operations;
 in response to the Pocc(i,j;k) satisfying the $\in occ$, perform a second set of operations.

7. The apparatus of claim 6, wherein the instantaneous mass calculator is configured to perform the first set of operations by being configured to:
 determine whether the position of the cell (i,j) is between the position of the radar sensor and a position of a cell (a,b) with a corresponding Pocc(a,b;k) that satisfies the $\in occ$;
 in response to the position of the cell (i,j) not being between the radar sensor and the position of the cell (a,b):
  calculate an instantaneous mass for a free state with low confidence;
  set an instantaneous mass for a static-dynamic state to zero; and
  set an instantaneous mass for a dynamic state to zero;
 in response to the position of the cell (i,j) being between the radar sensor and the position of the cell (a,b):
  calculate the instantaneous mass for the free state with high confidence;
  set the instantaneous mass for the static-dynamic state to zero; and
  set the instantaneous mass for the dynamic state to zero.

8. The apparatus of claim 7, wherein the instantaneous mass $m_{(i,j;k)}(F)$ for the free state of a cell (i,j) at the time k with low confidence is represented as:

$$m_{(i,j;k)}(F)=p^{f,1}*w^{f,1}(\theta_{i,j})*w^{f,1}(r_{i,j})$$

where $\theta_{i,j}$ represents an angle of the position of the cell (i,j) with respect to the position of the radar sensor, $r_{i,j}$ represents a range of the position of the cell (i,j) with respect to the position of the radar sensor, $p^{f,1}$ represents a constant, $w^{f,1}(\theta_{i,j})$ represents a first weight based on the sensor characteristic associated with the angle $\theta_{i,j}$, and $w^{f,1}(r_{i,j})$ represents a second weight based on the sensor characteristic associated with the range $r_{i,j}$.

9. The apparatus of claim 7, wherein the instantaneous mass $m_{(i,j;k)}(F)$ for the free state of a cell (i,j) at the time k with high confidence is represented as:

$$m_{(i,j;k)}(F)=p^{f,2}*w^{f,2}(\theta_{i,j})*w^{f,2}(r_{i,j})$$

where $\theta_{i,j}$ represents an angle of the cell position with respect to the position of the radar sensor, $r_{i,j}$ represents a range of the cell position with respect to the position of the radar sensor, $p^{f,2}$ represents a constant, $w^{f,2}(\theta_{i,j})$ represents a first weight based on the sensor characteristic associated with the angle $\theta_{i,j}$ and $w^{f,2}(r_{i,j})$ represents a second weight based on the sensor characteristic associated with the range $r_{i,j}$.

10. The apparatus of claim 6, wherein the instantaneous mass calculator is configured to perform the second set of operations by being configured to:
 determine whether an adjusted radial velocity associated with the cell (i,j) satisfies a velocity criterion $\in v$;
 in response to the adjusted radial velocity not satisfying the $\in v$:
  calculate an instantaneous mass for a static-dynamic state;
  set an instantaneous mass for a free state to zero; and
  set an instantaneous mass for a dynamic state to zero;
 in response to the radial velocity satisfying the $\in v$:
  calculate the instantaneous mass for the dynamic state;
  set the instantaneous mass for the free state to zero; and
  set the instantaneous mass for the static-dynamic state to zero.

11. The apparatus of claim 10, wherein the instantaneous mass $m_{(i,j;k)}(SD)$ for the static-dynamic state of a cell (i,j) at the time k is represented as:

$$m_{(i,j;k)}(SD)=Pocc(i,j;k)*\rho occ(\text{radar})$$

where $\rho occ(\text{radar})$ represents a weight based on the sensor characteristic.

12. The apparatus of claim 10, wherein the instantaneous mass $m_{(i,j;k)}(D)$ for the dynamic state of a cell (i,j) at the time k is represented as:

$$m_{(i,j;k)}(D)=Pocc(i,j;k)*\rho occ(\text{radar})$$

where $\rho occ(\text{radar})$ represents a weight based on the sensor characteristic.

13. A non-transitory computer readable medium (CRM), comprising computer executable code to:
 receive radar sensor data for a time k from a radar sensor;
 generate object data based on the radar sensor data, wherein the object data comprises locations at which radar reflections are centered;
 calculate, for each cell in a field of view (FOV) of the radar sensor, an instantaneous mass $m_{(i,j;k)}$ based on the object data and a radar sensor characteristic, wherein (i,j) represents a cell position; and
 accumulate, for each cell in the FOV, the calculated instantaneous mass $m_{(i,j;k)}$ and a prior accumulated mass $m_{(i,j;0:k-1)}$, wherein the prior accumulated mass $m_{(i,j;0:k-1)}$ represents an accumulation of instantaneous masses for (i,j) from a time 0 to a time k−1.

14. The non-transitory CRM of claim 13, wherein the computer executable code to calculate, for each cell in the FOV, an instantaneous mass $m_{(i,j;k)}$ further comprises computer executable code to:
 determine a probability of occupancy Pocc(i,j) based on a range of the cell (i,j) from the locations at which the radar reflections are centered;

determine a position of the cell (i,j) with respect to a position of the radar sensor;
update the Pocc(i,j) based on an ambiguity of the radar sensor data associated with the cell position;
determine whether the Pocc(i,j) satisfies an occupancy criterion ∈ occ;
in response to the Pocc(i,j) not satisfying the ∈ occ, perform a first set of operations; and
in response to the Pocc(i,j) satisfying the ∈ occ, perform a second set of operations.

15. The non-transitory CRM of claim 14, wherein the computer executable code to perform the first set of operations further comprises computer executable code to:
determine whether the cell position is between the position of the radar sensor and a position of a cell (a,b) with a corresponding Pocc(a,b) that satisfies the ∈ occ;
in response to the cell position not being between the position of the radar sensor and the cell position of the cell (a,b):
  calculate an instantaneous mass $m_{(i,j;k)}(F)$ for a free state with low confidence;
  set an instantaneous mass $m_{(i,j;k)}(SD)$ for a static-dynamic state to zero; and
  set an instantaneous mass $m_{(i,j;k)}(D)$ for a dynamic state to zero; and
in response to the cell position being between the position of the radar sensor and the cell position of the cell (a,b):
  calculate the instantaneous mass $m_{(i,j;k)}(F)$ for the free state with high confidence;
  set the instantaneous mass $m_{(i,j;k)}(SD)$ for the static-dynamic state to zero; and
  set the instantaneous mass $m_{(i,j;k)}(D)$ for the dynamic state to zero.

16. The non-transitory CRM of claim 15, wherein the instantaneous mass $m_{(i,j;k)}(F)$ of the cell (i,j) with low confidence is represented as:

$$m_{(i,j;k)}(F) = p^{f,1} * w^{f,1}(\theta_{i,j}) * w^{f,1}(r_{i,j})$$

where $\theta_{i,j}$ represents an angle of the cell position with respect to the position of the radar sensor, $r_{i,j}$ represents a range of the cell position with respect to the position of the radar sensor, $p^{f,1}$ represents a constant, $w^{f,1}(\theta_{i,j})$ represents a first weight based on the radar sensor characteristic associated with $\theta_{i,j}$, and $w^{f,1}(r_{i,j})$ represents a second weight based on the radar sensor characteristic associated with range $r_{i,j}$.

17. The non-transitory CRM of claim 16, wherein the second weight $w^{f,1}(r_{i,j})$ is a function in which the second weight $w^{f,1}$ decreases monotonically with range.

18. The non-transitory CRM of claim 16, wherein the radar sensor characteristic is a radar sensor gain, wherein the first weight $w^{f,1}(\theta_{i,j})$ represents the radar sensor gain as a function of angle normalized to a first number between zero and one, and wherein the second weight $w^{f,1}(r_{i,j})$ represents the radar sensor gain as a function of range normalized to a second number between zero and one.

19. The non-transitory CRM of claim 18, wherein the first weight $w^{f,1}(\theta_{i,j})$ is represented as:

$$w^{f,1}(\theta_{i,j}) = \begin{cases} \cos\left(\dfrac{|\theta_{i,j}| * 90}{\theta_{max}}\right) & \text{if } \theta_{i,j} \leq \theta_{max} \\ 0 & \text{otherwise} \end{cases}$$

where $\theta_{max}$ represents an angle of edges of the FOV, wherein the second weight $w^{f,1}(r_{i,j})$ is represented as:

$$w^{f,1}(r_{i,j}) = \begin{cases} 1 & \text{if } (r_{i,j}) < r_1 \\ e^{-b[(r_{i,j})-r_1]} & \text{if } r_1 \leq (r_{i,j}) \leq r_{max} \\ 0 & \text{otherwise} \end{cases}$$

where $r_1$ represents a range of an object, $r_{max}$ represents a maximum range for the radar sensor, and b represents a constant chosen based on the radar sensor characteristic.

20. The non-transitory CRM of claim 16, wherein $p^{f,1}$ represents a first constant, and wherein the instantaneous mass $m_{(i,j;k)}(F)$ of the cell (i,j) with high confidence is represented as:

$$m_{(i,j;k)}(F) = p^{f,2} * w^{f,2}(\theta_{i,j}) * w^{f,2}(r_{i,j})$$

where $p^{f,2}$ represents a second constant, $w^{f,2}(\theta_{i,j})$ represents a third weight based on the radar sensor characteristic associated with $\theta_{i,j}$, and $w^{f,2}(r_{i,j})$ represents a fourth weight based on the radar sensor characteristic associated with $r_{i,j}$.

21. The non-transitory CRM of claim 20, wherein the third weight $w^{f,2}(\theta_{i,j})$ and the fourth weight $w^{f,2}(r_{i,j})$ are normalized to a third, larger number between zero and one than the first weight $w^{f,1}(\theta_{i,j})$ and the second weight $w^{f,1}(r_{i,j})$.

22. The non-transitory CRM of claim 14, wherein the computer executable code to perform the second set of operations further comprises computer executable code to:
determine whether a radial velocity associated with the cell (i,j) satisfies a velocity criterion ∈ v;
in response to the radial velocity not satisfying the ∈ v:
  calculate an instantaneous mass $m_{(i,j;k)}(SD)$ for a static-dynamic state;
  set an instantaneous mass $m_{(i,j;k)}(F)$ for a free state to zero; and
  set an instantaneous mass $m_{(i,j;k)}(D)$ for a dynamic state to zero; and
in response to the radial velocity satisfying the ∈ v:
  calculate the instantaneous mass $m_{(i,j;k)}(D)$ for the dynamic state;
  set the instantaneous mass $m_{(i,j;k)}(F)$ for the free state to zero; and
  set the instantaneous mass $m_{(i,j;k)}(SD)$ for the static-dynamic state to zero.

23. The non-transitory CRM of claim 22, wherein the instantaneous mass $m_{(i,j;k)}(SD)$ of the cell (i,j) is represented as:

$$m_{(i,j;k)}(SD) = Pocc(i,j;k) * \rho occ(\text{radar})$$

where $\rho occ(\text{radar})$ represents a weight based on the radar sensor characteristic.

24. The non-transitory CRM of claim 22, wherein the instantaneous mass $m_{(i,j;k)}(D)$ of the cell (i,j) is represented as:

$$m_{(i,j;k)}(D) = Pocc(i,j;k) * \rho occ(\text{radar})$$

where $\rho occ(\text{radar})$ represents a weight based on the radar sensor characteristic.

25. A method, comprising:
receiving radar sensor data for a time k from a radar sensor;
generating object data based on the radar sensor data, wherein the object data comprises locations at which radar reflections are centered;
calculating, for each cell in a field of view (FOV) of the radar sensor, an instantaneous mass $m_{(i,j;k)}$ based on the object data and a radar sensor characteristic, wherein (i,j) represents a cell position, wherein calculating the instantaneous mass $m_{(i,j;k)}$ comprises:

determining a probability of occupancy Pocc(i,j) based on a range of the cell (i,j) from the locations at which the radar reflections are centered;
determining a position of the cell (i,j) with respect to a position of the radar sensor;
updating the Pocc(i,j) based on an ambiguity of the radar sensor data associated with the cell position;
determining whether the Pocc(i,j) satisfies an occupancy criterion $\in$occ;
in response to the Pocc(i,j) not satisfying the $\in$occ:
  determine whether the cell position is between the position of the radar sensor and a position of a cell (a, b) with a corresponding Pocc(a,b) that satisfies the $\in$occ;
  in response to the cell position not being between the position of the radar sensor and the cell position of the cell (a,b):
    calculate an instantaneous mass $m_{(i,j;k)}(F)$ for a free state with low confidence;
    set an instantaneous mass $m_{(i,j;k)}(SD)$ for a static-dynamic state to zero; and
    set an instantaneous mass $m_{(i,j;k)}(D)$ for a dynamic state to zero; and in response to the cell position being between the position of the radar sensor and the cell position of the cell (a,b):
    calculate the instantaneous mass $m_{(i,j;k)}(F)$ for the free state with high confidence;
    set the instantaneous mass $m_{(i,j;k)}(SD)$ for the static-dynamic state to zero; and
    set the instantaneous mass $m_{(i,j;k)}(D)$ for the dynamic state to zero; and
in response to the Pocc(i,j) satisfying the $\in$occ:
  determine whether a radial velocity associated with the cell (i,j) satisfies a velocity criterion $\in$v;
  in response to the radial velocity not satisfying the $\in$v:
    calculate an instantaneous mass $m_{(i,j;k)}(SD)$ for a static-dynamic state;
    set an instantaneous mass $m_{(i,j;k)}(F)$ for a free state to zero; and
    set an instantaneous mass $m_{(i,j;k)}(D)$ for a dynamic state to zero; and
  in response to the radial velocity satisfying the $\in$v:
    calculate the instantaneous mass $m_{(i,j;k)}(D)$ for the dynamic state;
    set the instantaneous mass $m_{(i,j;k)}(F)$ for the free state to zero; and
    set the instantaneous mass $m_{(i,j;k)}(SD)$ for the static-dynamic state to zero; and
accumulating, for each cell in the FOV, the calculated instantaneous mass $m_{(i,j;k)}$ and a prior accumulated mass $m_{(i,j;0:k-1)}$, wherein the prior accumulated mass $m_{(i,j;0:k-1)}$ represents an accumulation of instantaneous masses for (i,j) from a time 0 to a time k−1.

* * * * *